Nov. 23, 1937.  A. E. HENNINGER  2,100,215
CIRCUIT BREAKER CONTROL SYSTEM
Filed July 29, 1936
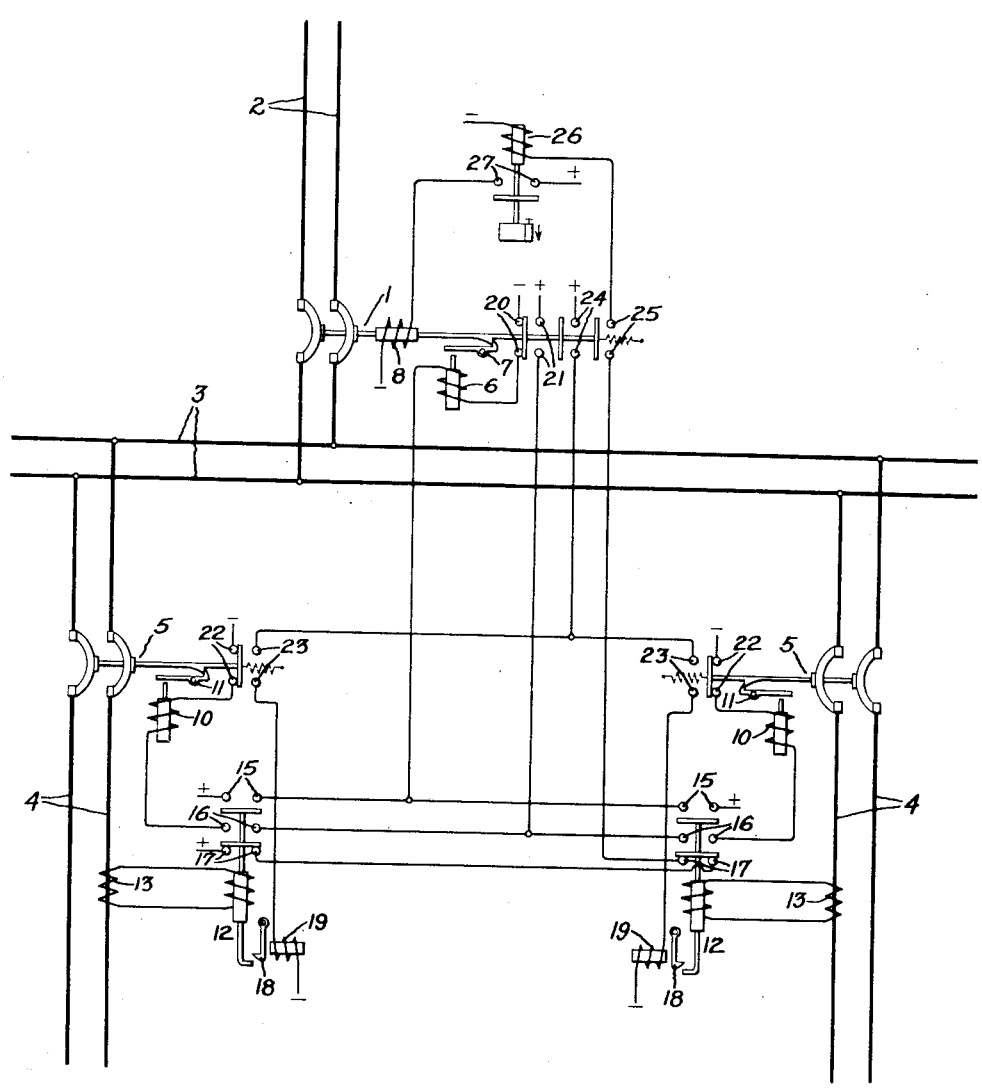
Inventor:
Alan E. Henninger,
by Harry E. Dunham
His Attorney.

Patented Nov. 23, 1937

2,100,215

UNITED STATES PATENT OFFICE 2,100,215

CIRCUIT BREAKER CONTROL SYSTEM

Alan E. Henninger, South Ardmore, Pa., assignor to General Electric Company, a corporation of New York Application July 29, 1936, Serial No. 93,241

5 Claims. (Cl. 175—294)

My invention relates to circuit breaker control systems and particularly to systems for controlling a group circuit breaker which connects a supply circuit to a supply bus and a plurality of circuit breakers, which respectively connect load circuits to the supply bus so that when a fault occurs on any load circuit, the group circuit breaker opens first to disconnect the supply circuit from the supply bus, then the circuit breaker in the faulty load circuit is opened, and then the group circuit breaker is reclosed to reconnect the supply circuit to the supply bus.

One object of my invention is to provide an improved arrangement for effecting the above-mentioned circuit breaker operation.

My invention will be better understood from the following description when taken in connection with the accompanying drawing, the single figure of which diagrammatically illustrates a circuit breaker control system embodying my invention, and its scope will be pointed out in appended claims.

Referring to the drawing, I represents a circuit breaker which is arranged to connect a supply circuit 2 to a supply bus 3. A plurality of load circuits 4 are respectively arranged to be connected to the supply bus 3 by circuit breakers 5. The circuit breakers 1 and 5 may be of any suitable type, examples of which are well-known in the art. As shown in the drawing, the circuit breaker 1 is of the latched-in type and is provided with a trip coil 6, which, when sufficiently energized, releases a latch 7 so that the circuit breaker 1 opens. The circuit breaker 1 is also provided with a closing coil 8 which, when energized, closes the circuit breaker. The circuit breakers 5 are also shown as latched-in circuit breakers and are respectively provided with trip coils 10 which, when energized, release the associated latches 11 which hold the respective circuit breakers in their closed positions. In the particular embodiment of my invention shown in the drawing, it is assumed that the circuit breakers 5 are manually reclosed, but it is obvious that any suitable closing means, examples of which are well-known in the art, may be provided for closing these circuit breakers.

Each load circuit 4 has associated therewith a relay 12 which is connected so as to respond to a predetermined abnormal condition of the circuit. As shown in the drawing, this relay is an overcurrent relay having an operating coil connected by means of a current transformer 13 to the associated load circuit in such a manner that the operating coil of the relay is energized in accordance with the current in the load circuit. Each overcurrent relay 12 is arranged so that it closes its contacts 15 and 16, and opens its contacts 17, when the current in the associated load circuit 4 exceeds a predetermined value. Each overcurrent relay 12 is also preferably arranged in any suitable manner, examples of which are well-known in the art, so that after the relay has operated in response to an overcurrent in the associated load circuit, it remains in its operated position independently of the energization of the operating coil of the relay. As shown in the drawing, this result is accomplished by means of a latch 18, which is arranged to be released by a release coil 19 associated therewith.

The operation of the arrangement shown in the drawing is as follows: Let it be assumed that while the circuit breakers 1 and 5 are closed, a fault occurs on one of the load circuits 4 so that sufficient current flows through the load circuit to which the fault is connected to cause the associated overcurrent relay 12 to move to its operated position, in which position it is held by the associated latch 18. By closing its contacts 15, the operated overcurrent relay 12 completes through the contacts 20 of the circuit breaker 1 an energizing circuit for the trip coil 6 so that the circuit breaker 1 opens to disconnect the supply circuit 2 from the supply bus 3. As soon as the circuit breaker 1 opens, its auxiliary contacts 21 complete through the contacts 16 of the operated overcurrent relay 12 and the auxiliary contacts 22 upon the circuit breaker in the faulty load circuit 4 an energizing circuit for the trip coil 10 of this circuit breaker so that the faulty load circuit is disconnected from the supply bus 3. As soon as the circuit breaker 5 in the faulty load circuit 4 opens, its auxiliary contacts 23 complete through the auxiliary contacts 24 on the open circuit breaker 1 an energizing circuit for the relay coil 19 associated with the operated overcurrent relay 12 so that this relay is restored to its normal position. When this relay has been restored to its normal position and has closed its contacts 17, a circuit is completed through the corresponding contacts 17 of the other overcurrent relays 12 if they are all in their normal positions and the contacts 25 on the open circuit breaker 1 for the operating winding of the control relay 26. By closing its contacts 27, the control relay 26 completes an energizing circuit for the closing coil 8 to reclose the circuit breaker 1 and thereby connect the supply circuit 2 to the supply bus 3, so that current is supplied to the load circuits 4, which are still connected to the supply bus 3.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent in the United States is:

1. In combination, a supply circuit, a supply bus, a circuit breaker between said supply circuit and said bus, a load circuit, a second circuit breaker connecting said load circuit to said supply circuit, a relay responsive to a predetermined abnormal condition in said load circuit, means for maintaining said relay in its operated position after said predetermined abnormal condition has been removed from said load circuit, means responsive to the operation of said relay for effecting the opening of said first-mentioned circuit breaker and the subsequent opening of said second circuit breaker, means responsive to the opening of said second breaker for restoring said relay to its normal position, and means responsive to the restoration of said relay to its normal position for reclosing said first-mentioned circuit breaker.

2. In combination, a supply circuit, a supply bus, a circuit breaker between said supply circuit and said bus, a load circuit, a second circuit breaker connecting said load circuit to said supply circuit, a relay responsive to a predetermined abnormal condition in said load circuit, means for maintaining said relay in its operated position after said predetermined abnormal condition has been removed from said load circuit, means responsive to the operation of said relay for effecting the opening of said first-mentioned circuit breaker, means responsive to the opening of said first-mentioned circuit breaker for effecting the opening of said second circuit breaker, means responsive to the opening of said second circuit breaker for restoring said relay to its normal position, and means responsive to the restoration of said relay to its normal position for reclosing said first-mentioned circuit breaker.

3. In combination, a supply circuit, a supply bus, a circuit breaker between said supply circuit and said bus, a load circuit, a second circuit breaker connecting said load circuit to said supply circuit, a relay responsive to a predetermined abnormal condition in said load circuit, means for maintaining said relay in its operated position after said predetermined abnormal condition has been removed from said load circuit, means responsive to the operation of said relay for effecting the opening of said first-mentioned circuit breaker, means controlled by said relay and said first-mentioned circuit breaker for effecting the opening of said second circuit breaker when said relay is in its operated position and said first-mentioned circuit breaker is open, means controlled by said circuit breakers for restoring said operated relay to its normal position when both of said circuits are simultaneously open, and means controlled by said first-mentioned circuit breaker and said relay for closing said first-mentioned circuit breaker when said relay is in its normal position and said first-mentioned circuit breaker is open.

4. In combination, a supply circuit, a supply bus, a circuit breaker between said supply circuit and said bus, a plurality of load circuits, an individual circuit breaker connecting each load circuit to said supply bus, an individual relay connected to each load circuit and responsive to a predetermined abnormal condition thereof, means for maintaining said relay in its operated position after said predetermined abnormal condition has been removed, means responsive to the operation of a relay for effecting the opening of said first-mentioned circuit breaker and the subsequent opening of the circuit breaker in the associated load circuit, means responsive to the opening of the circuit breaker in the associated load circuit for restoring said relay to its normal position, and means responsive to the restoration of the operated relay to its normal position for reclosing said first-mentioned circuit breaker.

5. In combination, a supply circuit, a supply bus, a circuit breaker between said supply circuit and said bus, a plurality of load circuits, an individual circuit breaker connecting each load circuit to said supply bus, an individual relay connected to each load circuit and responsive to a predetermined abnormal condition thereof, means for maintaining said relay in its operated position after said predetermined abnormal condition has been removed, and means responsive to the operation of a relay for effecting the opening of said first-mentioned circuit breaker, means controlled by said relays and said first mentioned circuit breaker for effecting the opening of the circuit breaker between a load circuit and said supply bus when the associated relay is in its operated position and said first-mentioned circuit breaker is open, means controlled by said circuit breakers for restoring an operated relay to its normal position when the circuit breaker in the associated load circuit and said first-mentioned circuit breaker are both open, and means controlled by said relays for reclosing said first-mentioned circuit breaker when all of said relays are in their normal positions and said first-mentioned circuit breaker is open.

ALAN E. HENNINGER.